United States Patent [19]

Thorp et al.

[11] 4,203,861
[45] * May 20, 1980

[54] INORGANIC COMPOUNDS

[75] Inventors: Anthony J. Thorp, Immingham; Frank Clamp, Grimsby; Raoul Feld, Cleethorpes; Joseph E. Page-Gibson, Grimsby; Keith Archer, Brigg, all of England

[73] Assignee: Laporte Industries Limited, London, England

[*] Notice: The portion of the term of this patent subsequent to Jan. 30, 1996, has been disclaimed.

[21] Appl. No.: 878,159

[22] Filed: Feb. 15, 1978

Related U.S. Application Data

[63] Continuation-in-part of Ser. No. 856,605, Dec. 1, 1977, Pat. No. 4,137,297.

[51] Int. Cl.$^2$ ............... C01G 23/00; H01M 4/58
[52] U.S. Cl. ..................... 252/182.1; 252/520; 423/88; 423/562; 429/218
[58] Field of Search ............ 252/182.1, 520; 423/88, 423/562; 429/218

[56] References Cited

U.S. PATENT DOCUMENTS

| | | | |
|---|---|---|---|
| 3,079,229 | 2/1963 | Garrett et al. | 423/562 |
| 3,933,688 | 1/1976 | Dines | 252/520 |
| 3,980,761 | 9/1976 | Thompson et al. | 429/218 |
| 4,007,055 | 2/1977 | Whittingham | 429/218 |
| 4,009,052 | 2/1977 | Whittingham | 429/218 |
| 4,060,667 | 11/1977 | Askew et al. | 429/218 |
| 4,084,046 | 4/1978 | Whittingham | 429/218 |

OTHER PUBLICATIONS

Hollock, G. L. et al., Electrochimica Acta, vol. 22, (1977), pp. 647–655.
Chianelli, R. R., J. of Crystal Growth, vol. 34 (1976), pp. 239–244.
Wittingham, M. S., J. Electrochem. Soc., vol. 23, No. 3 (1976), pp. 315–320.

Primary Examiner—Benjamin R. Padgett
Assistant Examiner—Irwin Gluck
Attorney, Agent, or Firm—Kane, Dalsimer, Kane, Sullivan and Kurucz

[57] ABSTRACT

Titanium disulphide particles comprising orthogonally intersecting plates, and having a relatively high surface area, e.g. above 4 m$^2$/g, in relation to its size, e.g. average largest diameter 2–16 microns, and a method for its preparation by the vapor phase reaction between titanium tetrachloride and hydrogen sulphide is provided. This material is susceptible to intercalation by, for example, lithium and may be used as an active cathodic material in electrochemical cells such as secondary batteries.

43 Claims, 6 Drawing Figures

INORGANIC COMPOUNDS

Cross-Reference to Related Application

This application is a continuation-in-part of our then copending U.S. patent application Ser. No. 856,605 filed on Dec. 1, 1977 and now issued as U.S. Pat. No. 4,137,297.

BACKGROUND OF THE INVENTION

1. Field of the Invention

This invention relates to layered inorganic compounds and, more particularly, to transition metal dichalcogenides and to intercalation complexes thereof.

2. Brief Description of the Prior Art

Certain transition metal dichalcogenides, notably titanium disulphide, have been proposed for use as active cathodic materials in electrochemical cells in view of the ease with which they may be intercalated, and de-intercalated, with ions derived from the active anodic material.

The physical effect of intercalation on the crystal structure of certain transition metal dichalcogenides has been reported in a paper by R. R. Chianelli in the Journal of Crystal Growth 34(1976) 239-244 and by M. S. Whittingham in the Journal of the Electrochemical Society 12, No. 3, (1976) 315-320. Both authors visualise intercalation to involve the entry of intercalating ions between the layers of the dichalcogenide structure accompanied by an increase in the spacing between the layers. In the case of titanium disulphide intercalated with lithium ions or with n-butyl lithium ions, Whittingham, in the above identified paper, reports x-ray diffraction measurements as indicating an increase of about 10% in the hexagonal lattice parameter on the c-axis. Chianelli also reports a lattice expansion of titanium disulphide intercalated with lithium of approximately 10%.

It may be anticipated that repeated expansion and contraction of the transition metal dichalcogenide crystal lattice during repeated intercalation and de-intercalation could cause disruption of the lattice. Such disruption could result in a decrease in the efficiency of the system in which the dichalcogenide is to be utilised. Chianelli reports observing cracking of crystals of titanium disulphide during intercalation and theorises that this may be due to the existence of twinning faults in the crystals.

Despite the physical stresses to which a crystal lattice is subjected during intercalation and deintercalation and the tendency of the crystals to crack, certain transition metal dichalcogenides, notably titanium disulphide, tend to retain their efficiency in use in an electrochemical cell relatively well. It is reported however, in U.S. Pat. No. 4,007,055 that the mobility of ions between the layers of titanium disulphide may be drastically lowered by the presence of interstitial titanium between the sulphur layers and that the presence of this interstitial titanium may be due to crystal imperfections due in turn to the crystal growth conditions. It is clear, therefore, that both crystal morphology and the avoidance of interstitial titanium are important properties in titanium disulphide intended for use as an active cathodic material.

SUMMARY OF THE INVENTION

The present invention provides titanium disulphide having a particular crystal morphology, its production and its utilisation as an active cathodic material in electrochemical cells.

The present invention particularly provides titanium disulphide in the form of particles comprising orthogonally intersecting plates or plate segments.

A bulk of titanium disulphide according to the invention may, and preferably does, comprise a numerical majority, particularly preferably at least 75%, of particles containing orthogonally intersecting plates or plate segments.

The word "orthogonal" is used herein, as is other descriptive matter herein relating to the shape or dimensions of particles according to the invention, in the sense of so appearing to the eye on suitable magnification of the particles using a scanning electron microscope. The word "intersecting" is used herein to mean the presence of a common line of contact not including a hexagonal plate edge, and often involving interpenetration, along which the plates or plate segments are attached.

DETAILED DESCRIPTION OF THE PREFERRED EMBODIMENTS OF THE INVENTION

Figure 1:
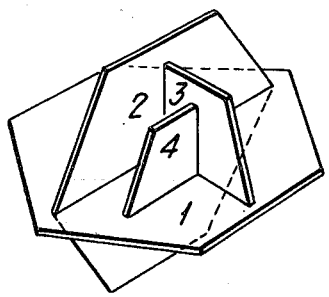
FIG. 1 is a view-in-perspective of a portion of titanium disulphide particles produced by the method of the invention and shows (A) two orthogonally intersecting and interpenetrating hexagonal plates 1 and 2, (B) a smaller hexagonal plate segment 3 orthogonally intersecting each of plates 1 and 2 thus providing lateral support therefor and (C) a yet smaller hexagonal plate segment 4 orthogonally intersecting plate 1 and plate segment 3.

Given ideal crystal growth conditions titanium disulphide crystallises in the form of hexagonal plates. Such ideal conditions are not easily provided, particularly in a full scale industrial process. For this reason, we think, the crystal form of titanium disulphide which has hitherto been on commercial sale has often comprised poorly formed crystals the shape of which has been barely discernible. We describe hereafter a process susceptible to full scale operation, according to which titanium disulphide according to the invention, of relatively excellent crystal form, may be produced. Even according to the last mentioned process crystal growth conditions are not perfect and, as a result, the particles of titanium disulphide so formed may comprise plate segments. Depending on the portion of the notional full plate which the segment represents it may be possible, and often is possible, to discern in the plate segment, features, i.e. edge angles, characteristic of a hexagonal form. In some cases plate segments comprising half of a hexagonal plate may be discerned, the intersection of the plate segment being along the centre line of the notional plate represented by the plate segment. In some cases it is not possible to discern in the plate segment any feature characteristic of a hexagonal form but it is assumed that this is due to the particular part of the notional fully formed plate represented by the plate segment not containing such a feature.

The structures which are orthogonally intersected according to the invention, therefore, may include fully formed hexagonal plates, plate segments showing features characteristic of a hexagonal form, and plate segments not showing features characteristic of a hexagonal form. The invention is not restricted to every plate or plate segment in a particle according to the invention intersecting with any other plate orthogonally, nor to every intersection of a plate or plate segment in the particle being orthogonal. Preferably however, in a bulk of particles according to the invention a numerical majority, particularly preferably at least 75%, of the plates or plate segments therein intersect at least one other plate or plate segment orthogonally. Preferably in a particle according to the invention, or in a bulk of them in at least 25%, particularly preferably more than 50% and most preferably at least 75% numerically of the particles, some or all of the preferred features set out below are present.

(a) A particle contains from 2 to 6 complete hexagonal plates.

(b) A particle contains at least 2 complete hexagonal plates intersecting, and interpenetrating, along a common centre line.

(c) Due to the approximate equivalence in size between at least the two largest plates or between a largest plate and plate segments intersecting therewith (judged by the notional longest diameter of an equivalent fully formed hexagonal plate) a particle is of isotropic appearance.

(d) A particle contains plates or plate segments of different sizes.

(e) At least two orthogonally intersecting plates or plate segments in a particle are buttressed laterally by one or more smaller plate segments intersecting both of them.

(f) A buttressing one or more smaller plates or plate segments is itself similarly buttressed by one or more yet smaller plates of plate segments.

(g) The aspect ratio of a plate or plate segment in a particle (largest diameter divided by thickness), is at least 10.

(h) The said aspect ratio is at least 30.

(j) In a particle the largest plate diameter is from 1 to 50 microns.

(k) In a particle the largest plate diameter is from 2 to 25 microns.

(l) In a bulk of particles the average largest plate diameter is from 2 to 16 microns.

(m) In a bulk of particles the loose bulk density is from 70 to 100 grams per liter.

(n) In a bulk of the particles the surface area is about 4 m$^2$/g. Preferably in a bulk of titanium disulphide particles according to the invention the features (a) to (k) occur in a numerical majority of the particles, although not necessarily all in the same particles, said bulk also possessing features (l) to (n). In such a bulk, in particular, the combination of the preferred particle size, bulk density and surface area is thought to be unique and to provide a high degree of utility in an application where penetration of the bulk by a substance is required as in the case of intercalation.

Figure 2:
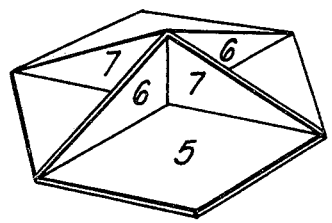
FIG. 2 is a view-in-perspective of another portion of a titanium disulphide particle of the invention and shows a hexagonal plate 5 orthogonally intersected by segments of larger plates 6 and 7 which are themselves mutually orthogonal.
Figure 3:
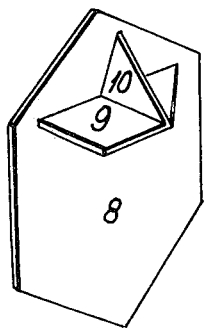
FIG. 3 is still another view-in-perspective of a portion of a titanium disulphide of the invention and shows a hexagonal plate 8 intersected orthogonally by a smaller plate segment 9 on a line of intersection not central to plate 8, plate 8 and plate segment 9 both being intersected by plate segment 10 which is orthogonal to neither.

By way of illustration of certain of the above described features, and without limitation to the exact forms of structure shown in titanium disulphide according to the invention reference is now made to the accompanying drawings. FIGS. 1-3 are diagramatic representations, not to scale, of portions of particles according to the invention.

FIG. 1 shows (A) two orthogonally intersecting and and interpenetrating hexagonal plates 1 and 2, (B) a smaller hexagonal plate segment 3 orthogonally intersecting each of plates 1 and 2 thus providing lateral support therefor and (C) a yet smaller hexagonal plate segment 4 orthogonally intersecting plate 1 and plate segment 3. As separate aspects the present invention provides each of the above mentioned features (A), (B) and (C) and also each of the following variations thereon in which feature (A) is modified by the orthogonal intersection not being on a common centre line, in which feature (B) is modified by segment 3 being at an angle, not orthogonal, to plate 2 or plate 3 and in which feature (C) is modified by segment 4 being at an angle, not orthogonal, to plate 1 or segment 3 and in which features (B) or (C) are modified by the plate segment not showing two edge faces mutually at an angle. No attempt has been made to illustrate in FIG. 1, or in FIGS. 2 or 3, following, the likely full structure of a particle according to the invention.

FIG. 2 shows a hexagonal plate 5 orthogonally intersected by segments of larger plates 6 and 7 which are themselves mutually orthogonal. As separate aspects the present invention provides such a feature and a variation thereof in which there are more larger orthogonally intersecting plate segments than illustrated or in which half of one or more of the larger plate segments is missing to give the appearance, from above, of a star having an uneven number of arms.

FIG. 3 shows a hexagonal plate 8 intersected orthogonally by a smaller plate segment 9 on a line of intersection not central to plate 8, plate 8 and plate segment 9 both being intersected by plate segment 10 which is orthogonal to neither. As separate aspects the present invention provides such a feature and a variation thereof in which plate segment 9 is positioned differently on plate 8 although still orthogonally positioned thereon.

Preferably the titanium disulphide particles according to the invention comprise titanium disulphide containing less than the stoichiometric quantity of titanium in the crystal lattice.

The titanium disulphide crystal lattice consists of layers, bound together by relatively weak Van der Waal's forces, of packed sulphur atoms amongst which the titanium atoms occupy octahedral holes. While not binding ourselves to the operation of the following theory, we believe, that if titanium disulphide contains less than the stoichiometric quantity of titanium in the crystal lattice some of the octahedral holes in the lattice which would have been filled by titanium atoms are empty but that the remainder of the structure of the lattice remains in being. Clearly there is an extent of absence of titanium atoms which could involve an undesirable degree of weakening of the crystal lattice structure. We believe that such an effect could become noticeable when, in the titanium disulphide formula $Ti_xS_2$, x is equal to less than 0.9. Preferably, according to the present invention, x in the above formula is at least equal to 0.925. Preferably, according to the present invention, x in the above formula is less than 0.99.

A method according to which particles of titanium disulphide according to the invention are formed in a gaseous medium is now described hereunder and comprises forming a dry oxygen-free reactant gas mixture having a mixed gas temperature as hereafter defined, above 400° C. and sufficient to enable the reaction to proceed and less than 500° C., the said mixture comprising titanium tetrachloride and hydrogen sulphide, the hydrogen sulphide being in an excess over the stoichiometric quantity for reaction with the titanium tetrachloride and the titanium tetrachloride and the hydrogen sulphide being separately preheated, passing the reactant gas mixture through a reaction zone as a gas stream having a velocity sufficient to entrain particles of titanium disulphide formed in the course of the reaction, subjecting the gas stream to a positive heat gradient in the reaction zone and recovering the particles of titanium disulphide from the entraining gases.

The term "mixed gas temperature" is used herein to mean the temperature which the reaction mixture would reach within the reaction zone if no reaction were to take place upon mixing and if the reactant stream were not subjected to the heat gradient. The mixed gas temperature is calculable from the volumes and temperatures of the constituents of the reactant gas stream, bearing in mind the possibility of heat losses during the transport of preheated constituents of the reactant gas stream, to the reaction zone.

When we refer to a dry oxygen-free reactant gas mixture we mean that normal precautions should be employed to remove water vapour and oxygen from the constituents of the gas mixture so that the residual levels of these substances are as low as reasonably practicable. If water vapour is present in the reactant gas mixture it could react with the titanium tetrachloride resulting in the formation of small particles of titanium oxychloride. If oxygen is present in the reactant gas stream it could react with the titanium tetrachloride to form small particles of titanium dioxide. Titanium oxychloride or titanium dioxide so formed are undesirable impurities in the titanium disulphide product. Such impurities could have an undesirable effect on the crystal form of the product. Preferably the quantity of hydrogen present in the reactant gas stream is also as low as possible since its presence could affect the stoichiometry of the titanium disulphide product by a reduction mechanism.

The mixed gas temperature is preferably not more than 495° C. and, particularly preferably, not more than 480° C. The mixed gas temperature is preferably greater than 450° C. and, particularly preferably, at least 455° C. At a mixed gas temperature of 450° C. or lower the extent to which the reaction proceeds may be reduced.

To encourage the formation of particles according to this invention and, particularly, to avoid conditions likely to have an adverse effect on crystal formation, differences between the temperatures of the constituents of the reactant gas mixture are preferably minimised or avoided. Preferably any difference between the temperatures of the constituents of the reactant gas mixture is less than 50° C.

Hydrogen sulphide gas tends to decompose at lower temperatures than might be expected from the published literature. The decomposition of hydrogen sulphide gas during the operation of the present process could result in a relatively high content of sulphur in the titanium disulphide product. Since sulphur is an undesirable impurity it would be necessary to conduct a further process step to remove the sulphur, for example, by solvent extraction. This is a further reason for avoiding excessively high hydrogen sulphide preheat temperatures.

The positive inward heat gradient utilised in the present process tends to counteract any tendency for the temperature of the reactant gas mixture to drop due to the endothermicity of the reaction between titanium tetrachloride and hydrogen sulphide. Such a heat gradient may be achieved by heat exchange with a wall surrounding the reaction zone and maintained at or above the mixed gas temperature by external heating means. For example, the wall may be equipped with electrical heating means and externally lagged to reduce heat loss. Preferably, and to ensure so far as possible that the temperature of the reactant gas stream does not fall to 450° C., the positive gradient is provided by heat exchange with a material having a temperature above the mixed gas temperature, for example, by heat exchange with a reactor wall. Preferably the said material has a temperature less than 50° C. above the mixed gas temperature employed.

Preferably the reactant gas mixture contains an inert diluent gas.

To encourage crystal formation, the initial partial pressures of the constituents of the reactant gas mixture are preferably carefully selected. Preferably the initial partial pressures of the titanium tetrachloride and the hydrogen sulphide are from 0.01 to 0.25 and from 0.05 to 0.60 atmospheres respectively. Particularly preferably the initial partial pressures of the titanium tetrachloride and the hydrogen sulphide are from 0.02 to 0.20 and from 0.10 to 0.50 atmospheres respectively, for example, from 0.03 to 0.12 and from 0.10 to 0.35 atmospheres respectively. In one preferred embodiment of the present process the titanium tetrachloride has an initial partial pressure of from 0.05 to 0.12 atmospheres and the hydrogen sulphide has an initial partial pressure of from 0.20 to 0.35 atmospheres. The inert diluent gas may, for example, be argon, helium or nitrogen. Preferably the inert diluent gas is divided between the titanium tetrachloride and the hydrogen sulphide and mixed with these gases before they are introduced into the reactant gas mixture.

Preferably, the hydrogen sulphide is present in an excess of at least 25% and not more than 100% and, particularly preferably, from 25% to 75% in excess of the stoichiometric quantity for the formation of titanium disulphide.

Preferably, the present process is operated in a tube or tunnel reactor. Particularly suitable materials of construction for the reactor are silica or other similar refractory materials. The reactor may be positioned vertically or horizontally. It is a basic requirement of the present process so that crystal formation may be encouraged that the particles of titanium disulphide be formed in a gaseous medium. If the reactor is positioned vertically and the reactant stream flows downwardly the particles as formed will be in free fall and a high minimum velocity in the reactant gas stream will not be necessary. In such a case it is preferred that the reactant gas stream has a velocity giving a Reynolds Number of from 100 to 400. On the other hand, if the reactant is positioned horizontally, a velocity high enough to entrain the particles of titanium disulphide will be necessary. It is desirable to avoid, so far as possible, localised zones within the reaction zone in which hydrogen sulphide is not in excess over titanium tetrachloride. Preferably, therefore, the reactants are in turbulence at their point of entry into the reactor and, for example, titanium tetrachloride may be passed into a turbulent body of hydrogen sulphide. Preferably the titanium tetrachloride and hydrogen sulphide are passed into a reactor in the form of streams having Reynolds Numbers of at least 3000. Preferably the dimensions of the reactor are such that the reactant stream has a Reynolds Number below 2000.

Preferably the reactants have a residence time of from 1 to 25 seconds, for example from 2 to 15 seconds, in the reaction zone.

The titanium disulphide particles are suitably separated from entraining gases by passing the gas stream to a collection box the box being maintained at a temperature above the dew point of volatile chlorides, e.g. $TiCl_4$, present therein and preferably also maintained at a temperature not above 250° C. Preferably the collection box is maintained at a temperature of from 130° C. to 200° C. The titanium disulphide particles are then allowed to cool under dry oxygen-free gas such as nitrogen. The desired temperature control may be attained by the use of an unlagged or partially lagged pipe through which the entrained product is transported to the collection box from the reaction zone. The product is preferably stored under an inert gas such as nitrogen. Titanium disulphide can be pyrophoric and the usual safety precautions should be used to prevent ignition.

One form of apparatus which may be used in the preparation of titanium disulphide according to this invention will now be specifically described with reference to FIG. 4 attached hereto.

Figure 4:
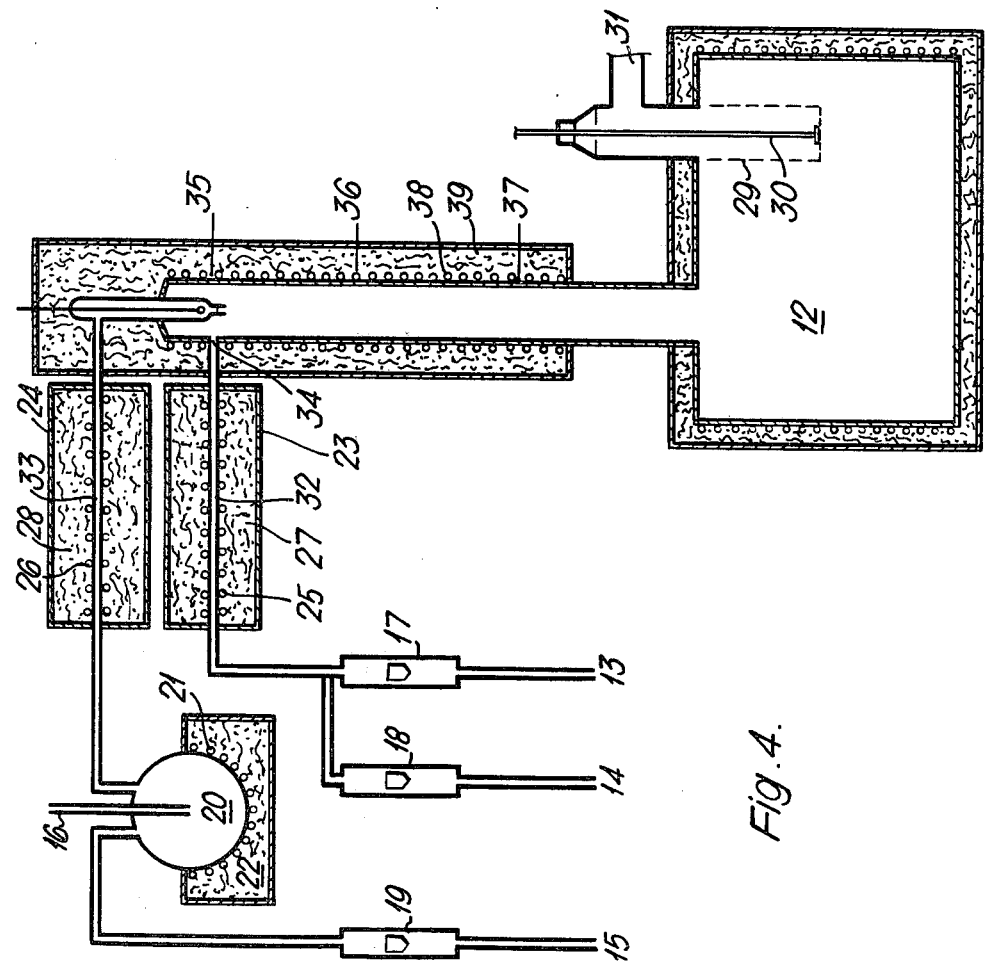
FIG. 4 is a schematic drawing of embodiment apparatus for carrying out the process of the invention.

FIG. 4 shows, in elevation and not to scale, the arrangement of the apparatus.

The apparatus comprises a reactor 11, made of silica and 4 inches in diameter and 34 inches in length, and a product collector 12 together with ancilliary equipment. The ancilliary equipment comprises feed pipes 13, 14, 15 and 16 for hydrogen sulphide, inert gas, inert gas and titanium tetrachloride respectively, gas flowmeters 17, 18 and 19, a flash boiler 20 for the titanium tetrachloride surrounded by a heating element 21 and insulation 22, hydrogen sulphide and titanium tetrachloride preheaters 23 and 24 respectively each comprising a heating element 25 and 26 and insulation 27 and 28 respectively, a filter bag 29 with a filter agitator 30 and a waste gas outlet 31. The apparatus is also equipped with thermocouples 32 to 37. The reactor 11 is surrounded by a heating element 38 and insulation 39.

One form of a process for the production of titanium disulphide according to the invention in the above apparatus will now be specifically described.

In the production of particles of titanium disulphide using the above described apparatus a metered quantity of titanium tetrachloride is metered into the flash boiler 20 in which it is vapourised and mixed with a metered quantity of inert gas from inlet 15 and after which it is passed into the reactor 11 through the preheater 24 by means of which its temperature is suitably raised. Simultaneously metered quantities of hydrogen sulphide and inert gas from inlets 13 and 14 are mixed and passed into the reactor 11 through the preheater 23. The product of the ensuing reaction is allowed to fall into the collector 12 where it is separated from the residual gases by the filter 29. The thermocouples 32 to 37 give signals enabling the temperature of the reaction to be closely controlled, e.g. by varying the element temperatures. The $TiCl_4$ used is commercially pure, as used for the manufacture of titanium dioxide pigment by the chloride process. The $H_2S$ used is commercially pure ($>99\%$ wt $H_2S$) and, additionally, is dried by passing it through a molecular sieve. Nitrogen is used as the diluent gas after passing it over solid manganous oxide in the cold and then through a molecular sieve to remove moisture.

The feed rates of the reactants are controlled as follows:

| | |
|---|---|
| $TiCl_4$ l/min | 2.2 |
| Diluent gas l/min | 7 |
| $H_2S$ l/min | 6 |
| Diluent gas l/min | 7 |
| $H_2S/TiCl_4$ moles | |
| $TiCl_4$ partial pressure | 0.09 |
| $H_2S$ (atmospheres) | 0.27 |

In a series of preparations, in which the above stated feed rates and reactants are used and the preheat and reactant wall temperatures are adjusted to give the following theoretical mixed gas temperatures, products having the stated stoichiometry are obtained.

Table A

| Preparation No. | Temperature °C. | Stoichiometry $X$ in $Ti_xS_2$ |
|---|---|---|
| 1 | 470 | 0.987 |
| 2 | 490 | 0.996 |
| 3 | 500 | 1.002 |

The determination of stoichiometry is conducted by analysis on a product which has been extracted in a Soxhlet apparatus with dry carbon tetrachloride for 16 hours to remove any free sulphur followed by evacuation under 20 inches of Hg in a Petri dish in the presence of silica gel for 6 hours to remove any residual carbon tetrachloride. (The words Soxhlet and Petri are Trade Marks.)

The products of preparations 1, 2 and 3 comprised particles of titanium disulphide according to the invention having a bulk density of from 70–100 grams/liter, a surface area of more than 4 $m^2$/gram, an average largest plate diameter of from 2 to 16 microns and an isotropic appearance. The particles comprised a numerical majority of particles comprised of orthogonally intersecting plates or plate segments.

Figure 5:
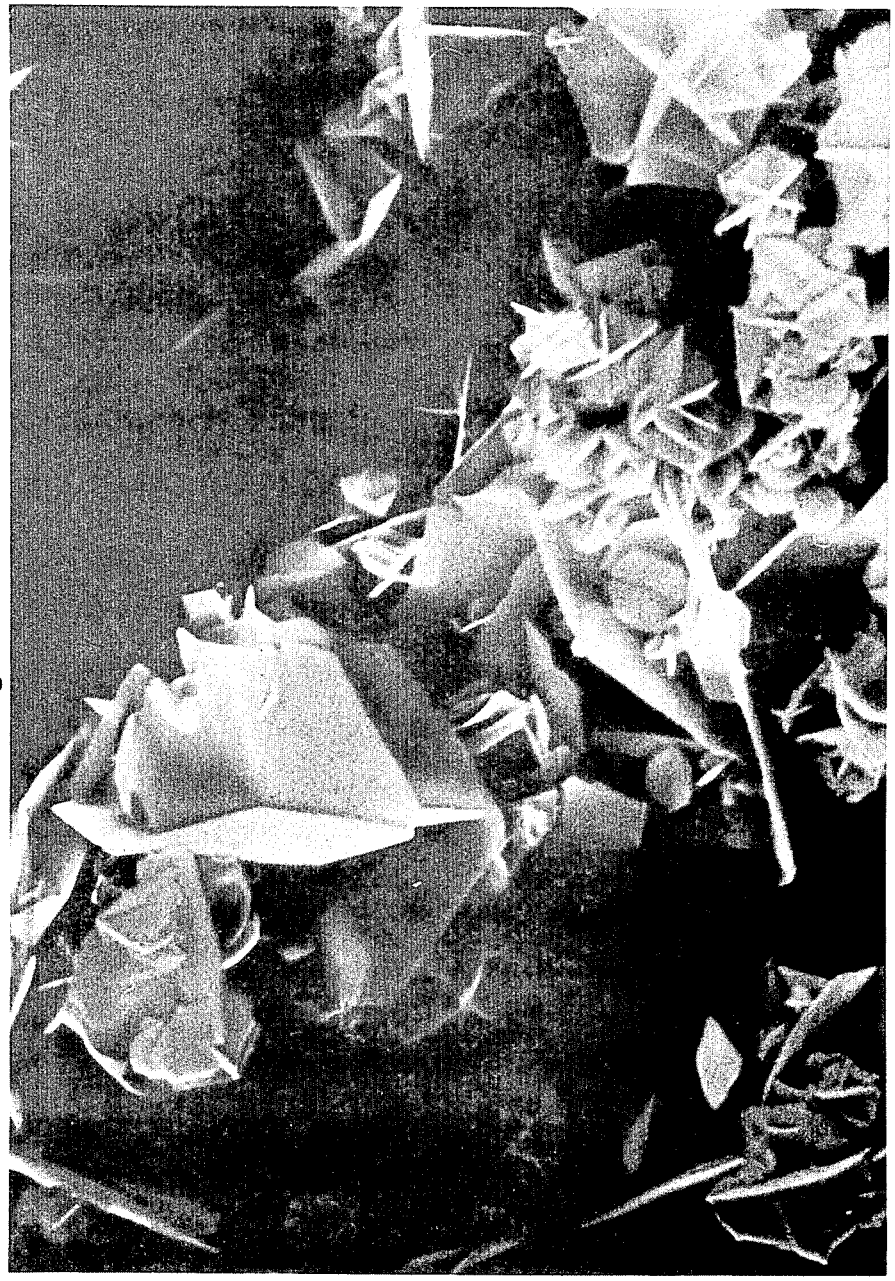
FIG. 5 is a scanning electron microscope view of titanium disulphide, typical of the products of the process of the invention.

FIG. 5 attached hereto is a scanning electron microscope view of titanium disulphide, typical of the products of preparations 1 to 3 and formed in a gaseous medium as hereinbefore described, viewed under a magnification as indicated by the photograph on which 1.75 cm is equal to 3 microns.

It is known that certain organic materials, for example pyridine, may be readily intercalated into titanium disulphide in the same manner as lithium. The performance of titanium disulphide with respect to pyridine intercalation bears a relationship to the performance of the titanium disulphide as an active cathodic material in an electrochemical cell, for example in a secondary battery in which the active anodic material is lithium. We therefore use pyridine intercalation as a yardstick of titanium disulphide performance herein.

A method for testing the pyridine intercalation properties of a sample of titanium disulphide will now be specifically described.

A sample of the titanium disulphide is first extracted in a Soxhlet apparatus for 16 hours with dry carbon tetrachloride. The excess carbon tetrachloride is removed from the $TiS_2$ by placing the sample on a Petri dish in a silica gel desiccator and evacuating it until it is dry, for example, for about 6 hours at 20 inches of mercury.

The dried sample is then quickly powdered and loaded into a glass test tube approximately 12" long, 0.4" diameter, fitted with a rotoflow valve, the sample occupying a depth of 2" in the bottom of the tube. Dry pyridine is then poured into the tube, covering the $TiS_2$. The tube is placed into a vacuum flask containing liquid nitrogen and evacuated through a side tube for 5 minutes at about 1 mm. of mercury. The tube is then sealed and heated in an oven for about 16 hours at 150° C.

The tube is removed from the oven and cooled to room temperature before shaking and emptying the contents into a Petri dish and placing the dish in a vacuum desiccator for 2 hours at about 1 mm. of mercury to pump off the excess pyridine.

The measurement of degree of intercalation of the titanium disulphide in the sample by pyridine is based on the comparison of X-ray diffraction peaks from the intercalated and un-intercalated peaks given by the sample.

A Phillips diffractometer is used with Co K$\alpha$ radiation. Since the peaks occur rather close together, great care must be taken with alignment of the diffractometer to eliminate as much overlap as possible. Any conditions which degrade resolution, e.g. use of a monochromator, are avoided.

The intercalated specimen is mounted in the standard specimen holder by firm thumb pressure onto a glass slide in the standard manner. This method of mounting produces a significant but variable amount of preferred orientation in the specimen, so the peaks selected for comparison must be insensitive to this. The basal planes have been selected on the grounds that although preferred orientation enhances these peaks relative to non-basal plane reflections, it is reasonable to assume that in a specimen containing both intercalated and un-intercalated phases, preferred orientation effects will be the same for both phases.

The 001 reflection for $TiS_2$ occurs at $2\theta \sim 18.0°$, $d \sim 5.72$Å. On intercalation this d spacing increases and due to the formation of a superlattice it is now assigned the index 003. The 006 reflection occurs at $2\theta \sim 17.5°$, $d \sim 5.88$Å. The positions of all these peaks are slightly variable, and no significance has been given to this. The intercalation ratio of the net peak heights (006 $TiS_2$ Py/001 $TiS_2$) is used as a measure of degree of intercalation.

The products of preparations 1 to 3 give the intercalation ratios stated in Table B. As a comparison the intercalation ratio of a sample of titanium disulphide, produced by Ventron Corporation, Alfa Products, Beverley, Mass., USA as 99.5% $TiS_2$ and having a density of 3.22 at 20° C., was determined by the same method and is also given in Table B. This product analysed at $Ti_{1.004}S_2$ by the method of stoichiometry determination above described.

Figure 6:
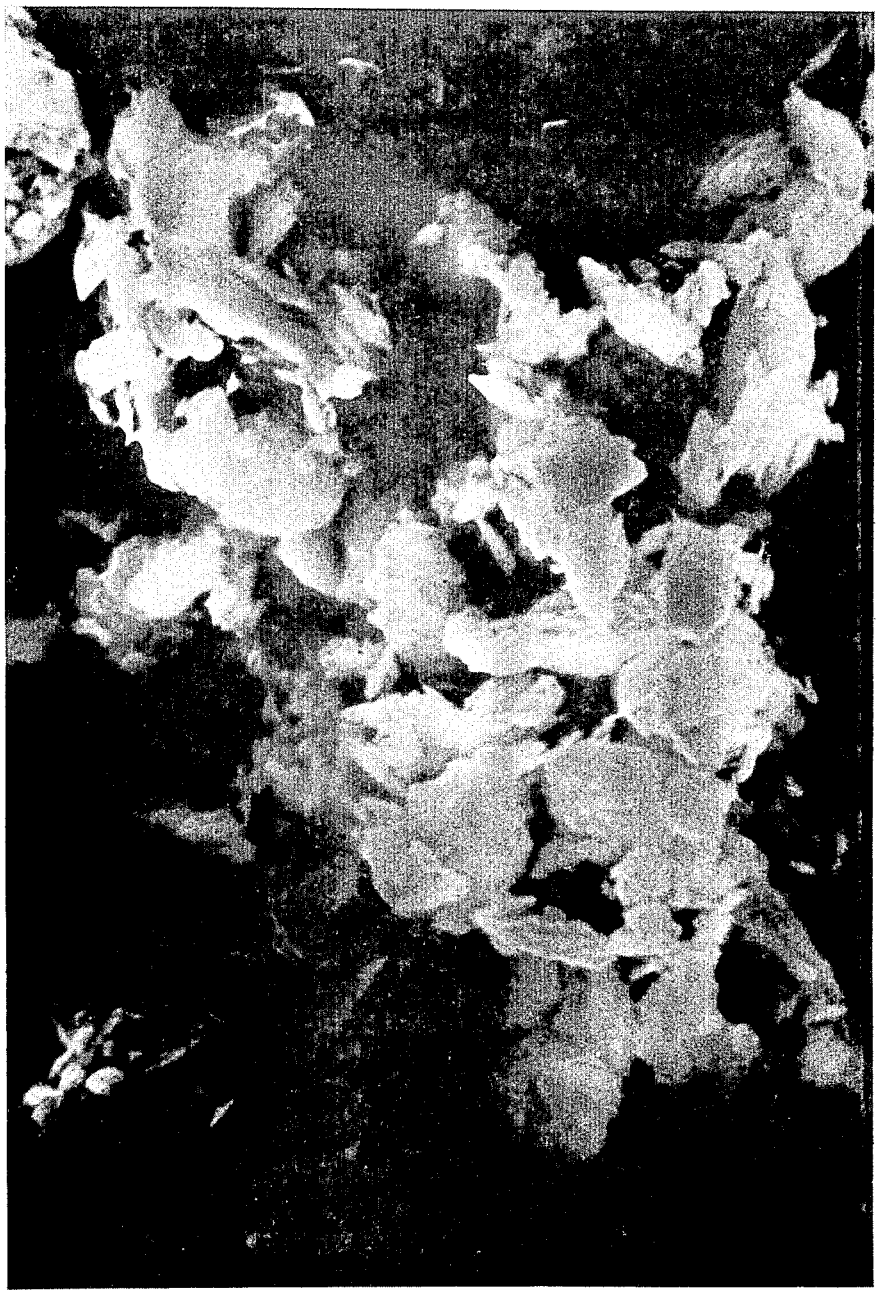
FIG. 6 is a scanning electron microscope view of prior art titanium disulphide particles.

FIG. 6 is a scanning electron microscope view of particles of the same sample of Ventron Corp. material under a magnification as indicated by the photograph on which 1.75 cm is equal to 3 microns.

The Ventron material did not have a crystal morphology according to the invention but comprised flake-like particles in which crystal morphology was not clearly discernible.

Table B

| Preparation No. | Intercalation Ratio |
| --- | --- |
| 1 | 8.8 |
| 2 | 7.0 |
| 3 | 4.1 |
| Ventron Corp $TiS_2$ | 1.2 |

Preferably titanium disulphide according to the present invention has an intercalation ratio measured as above described of at least 2 and preferably of from 4 to 12.

The present invention also provides an intercalate comprising particles of titanium disulphide according to this invention. The intercalating substance may be an organic material such as pyridine but, in a particularly preferred embodiment of this invention, it may be alkali metal ions or other inorganic ions, known as active anodic materials in electrochemical cells. Particularly preferably the intercalate comprises lithium ions which ions are of a radius very similar to that of the octahedral interstites in the sulphur lattice of the titanium disulphide.

The present invention further provides cathodes for electrochemical cells, for example secondary batteries, in which the active cathodic material comprises particles of titanium disulphide according to this invention either in the intercalated deintercalated or un-intercalated state.

We claim:

1. Titanium disulphide particles comprising orthogonally intersecting interpenetrating plate segments.

2. Titanium disulphide as claimed in claim 1 comprising particles containing from 2 to 6 hexagonal plates.

3. Titanium disulphide as claimed in claim 1 wherein at least two hexagonal plates interpenetrate along a common centre line.

4. Titanium disulphide as claimed in claim 1 comprising particles of isotropic appearance.

5. Titanium disulphide as claimed in claim 1 comprising particles in which at least two orthogonally intersecting plate segments have at least one smaller plate segment intersecting each of them.

6. Titanium disulphide as claimed in claim 5 comprising particles in which at least one yet smaller plate segment intersects one of the at least two orthogonally intersecting plate segments and the said smaller plate segment.

7. Titanium disulphide as claimed in claim 1 comprising particles in which a plate segment has an aspect ratio of at least 10.

8. Titanium disulphide as claimed in claim 7 comprising particles in which a plate segment has an aspect ratio of at least 30.

9. Titanium disulphide as claimed in claim 1 comprising particles in which the largest plate diameter is from 1 to 50 microns.

10. Titanium disulphide as claimed in claim 9 comprising particles in which the largest plate diameter is from 2 to 25 microns.

11. A bulk of titanium disulphide particles in which at least 25% of the particles are as claimed in claim 1.

12. A bulk of titanium disulphide particles in which a numerical majority of the particles are as claimed in claim 1.

13. In a bulk of titanium disulphide particles in which at least 75% of the particles are as claimed in claim 1.

14. In a bulk of titanium disulphide particles as claimed in claim 1 an average largest plate diameter of from 2 to 16 microns.

15. In a bulk of titanium disulphide particles as claimed in claim 1 a loose bulk density of from 70 to 100 grams per liter.

16. In a bulk of titanium disulphide particles as claimed in claim 1 a surface area above 4 $m_2/g$.

17. Titanium disulphide as claimed in claim 1 having the general formula $Ti_xS_2$ wherein x has a value of from 0.90 to 0.99.

18. Titanium disulphide as claimed in claim 18 having the general formula $Ti_xS_2$ wherein x has a value of from 0.925 to 0.99.

19. Titanium disulphide as claimed in claim 1 capable of giving a pyridine intercalation ratio, measured as described herein, of at least 2.

20. Titanium disulphide as claimed in claim 19 capable of giving a pyridine intercalation ratio, measured as described herein, of from 4 to 12.

21. An intercalate comprising titanium disulphide as claimed in claim 1.

22. An alkali metal intercalate as claimed in claim 21.

23. A lithium intercalate as claimed in claim 22.

24. A cathode comprising as active cathodic material titanium disulphide as claimed in claim 1.

25. A cathode comprising an intercalate as claimed in claim 21.

26. A process for the manufacture of titanium disulphide comprising forming a dry oxygen-free reactant gas mixture having a mixed gas temperature as herein defined, above 400° C. and sufficient to enable the reaction to proceed and less than 500° C., the said mixture comprising titanium tetrachloride and hydrogen sulphide, the hydrogen sulphide being in an excess over the stoichiometric quantity for reaction with the titanium tetrachloride and the titanium tetrachloride and the hydrogen sulphide being separately preheated, passing the reactant gas mixture through a reaction zone as a gas stream having a velocity sufficient to entrain particles of titanium disulphide formed in the course of the reaction, subjecting the gas stream to a positive heat gradient in the reaction zone and recovering the particles of titanium disulphide from the entraining gases.

27. A process as claimed in claim 21 wherein the mixed gas temperature is at least 450° C.

28. A process as claimed in claim 26 wherein the mixed gas temperature is not more than 495° C.

29. A process as claimed in claim 26 wherein the mixed gas temperature is from 455° C. to 480° C.

30. A process as claimed in claim 26 wherein any difference between the temperatures of the constituents of the reactant gas mixture is less than 50° C.

31. A process as claimed in claim 26 wherein the heat gradient is provided by heat exchange with a heat source having a temperature above, but less than 50° C. above, the mixed gas temperature.

32. A process as claimed in claim 26 wherein the reactant gas mixture contains an inert diluent gas.

33. A process as claimed in claim 26 wherein the initial partial pressure of titanium tetrachloride in the reactant gas mixture is from 0.01 to 0.25.

34. A process as claimed in claim 26 wherein the initial partial pressure of the hydrogen sulphide in the reactant gas mixture is from 0.05 to 0.60.

35. A process as claimed in claim 26 wherein the initial partial pressures of titanium tetrachloride and hydrogen sulphide in the reactant gas mixture are respectively from 0.02 to 0.20 and from 0.10 to 0.50.

36. A process as claimed in claim 35 wherein the said initial partial pressures are from 0.03 to 0.12 and from 0.10 to 0.35 respectively.

37. A process as claimed in claim 36 wherein the said initial partial pressures are from 0.05 to 0.12 and from 0.20 to 0.35 respectively.

38. A process as claimed in claim 26 wherein the hydrogen sulphide is initially in the reactant gas mixture in an excess of from 25% to 75% over the quantity required in theory to react with the titanium tetrachloride.

39. A process as claimed in claim 26 wherein the separately preheated titanium tetrachloride and hydrogen sulphide each mixed with inert diluent gas are passed into a reactor in the form of streams having Reynolds Numbers at their points of entry into the reactor of at least 3000 and the reactant gas stream formed in the reactor has a Reynolds Number below 2000.

40. A process as claimed in claim 26 wherein the residence time of the reactant gas in the reaction zone is from 1 second to 25 seconds.

41. A process as claimed in claim 26 wherein the titanium disulphide particles are separated from the entraining gases by passing the gas stream into a collection box maintained at a temperature above the dew point of titanium tetrachloride in the stream but not above 250° C.

42. A process as claimed in claim 41 wherein the collection box is maintained at a temperature of from 130° C. to 200° C.

43. The particles of claim 1 wherein at least one of said segments comprise a complete hexagonal plate.

* * * * *

UNITED STATES PATENT AND TRADEMARK OFFICE
CERTIFICATE OF CORRECTION

PATENT NO. : 4,203,861
DATED : May 20, 1980
INVENTOR(S) : Anthony J. Thorp et al It is certified that error appears in the above-identified patent and that said Letters Patent are hereby corrected as shown below:

Column 10, Claim 1, line 2 of Claim 1; between the words "interpenetrating" and "plate" insert -- hexagonal --

Column 11, Claim 16; line 2 of Claim 16; "$4M_2/g$" should read -- $4M^2/g$ --

Column 11, Claim 18, line 1 of Claim 18; "18" should read -- 17 --

Signed and Sealed this

Twelfth Day of August 1980

[SEAL]

Attest:

SIDNEY A. DIAMOND

*Attesting Officer*      *Commissioner of Patents and Trademarks*